April 18, 1939.   S. DASHKIN   2,154,890

STEREOPTICON SLIDE

Filed March 5, 1938

SOL DASHKIN
INVENTOR

Patented Apr. 18, 1939

2,154,890

UNITED STATES PATENT OFFICE 2,154,890

STEREOPTICON SLIDE

Sol Dashkin, Brooklyn, N. Y.

Application March 5, 1938, Serial No. 194,068

1 Claim. (Cl. 273—141)

This invention relates generally to a game apparatus, but more specifically to a stereopticon slide used in conjunction with a projector whereby the image of the slide containing movable parts is projected on the screen.

The main object of the invention resides in the provision of a stereopticon slide having a single transparent plate on which are mounted a plurality of rotatable indicators, the said plate having means for receiving impulses to commence initial rotation of the indicators.

A further object of the invention resides in the provision of a stereopticon slide having a single transparent plate and a framework therefor, the said framework having channels to act as conduits for directing blasts of air along a surface of the plate and against miniature windmills associated with each of the indicators.

Another object of the invention resides in the provision of a stereopticon slide which is economical to manufacture, easily accessible for purposes of repair and efficient in operation.

These objects and other incidental ends and advantages of the invention will hereinafter be set forth in the progress of the disclosure and as pointed out in the appended claim.

Accompanying this specification is a drawing showing a preferred form of the invention wherein corresponding reference characters designate corresponding parts throughout the several views and wherein.

Figure 1:
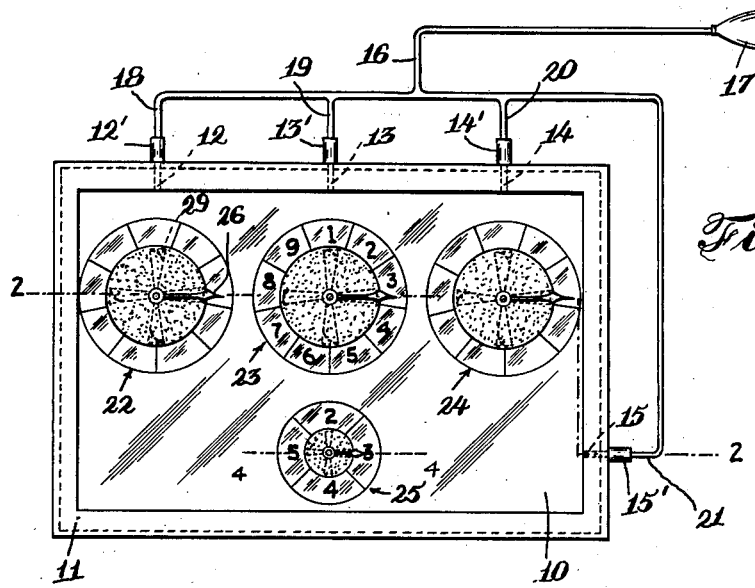
Figure 1 is a top plan view of the stereopticon slide showing a series of interconnected air-tubes for driving the several indicators.
Figure 2:
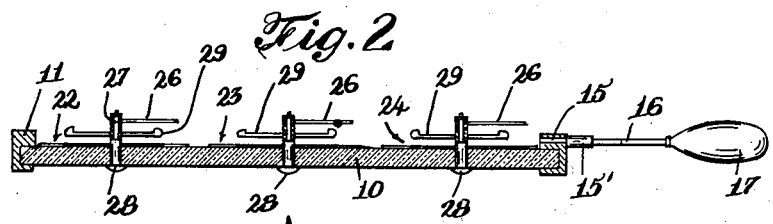
Figure 2 is a sectional view of Figure 1 along the plane 2—2 thereof, the arrow of Figure 2 showing the direction of projection of the images on the slide.
Figure 3:
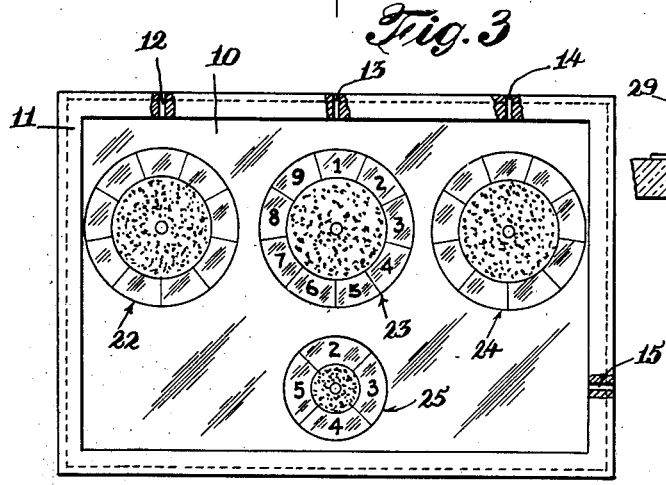
Figure 3 is a top plan view of the stereopticon slide with the windmills and indicators removed and with the omission of the several air-tubes, the said Figure 3 showing the framework partially in section.
Figure 4:
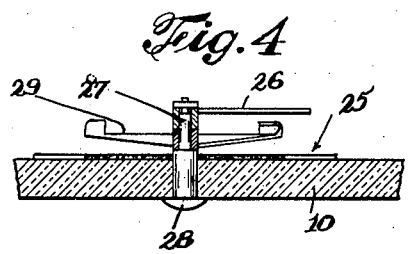
Figure 4 is a sectional view of Figure 1 through the plane 4—4 thereof.

In accordance with the invention and in accordance with a preferred form thereof shown in the accompanying drawing, numeral 10 indicates a transparent plate preferably rectangular in shape and having a framework 11 secured to the margins thereof. The framework 11 extends inwardly of the edges of plate 10 and serves as both a mounting means for plate 10 in the projector and as a grasping surface for the fingers of the projector operator. Framework 11 along either the upper or lower surface is preferably thickened so that a plurality of transverse orifices 12, 13 and 14 may be made along one of the longer sides thereof. These orifices are provided with communicating nipples 12', 13' and 14' which are preferably mounted on the outer edge of the side of the frame as best shown in Figure 1. 15 is a similar transverse orifice along an adjacent side of framework 11 and is similarly provided with a nipple 15'. Tubing means are provided to be detachably engaged to each of the nipples, the said tubing means being connected to a common source whereby an impulse or blast of air may be transferred through each of the openings 12, 13, 14 and 15 in a single operation. Thus, tube 16 is provided with branches 18, 19, 20 and 21, the said tube 16 communicating with an air source such as a compression bulb 17.

Opposite the inner ends of each of the orifices 12, 13, 14 and 15 are dials 22, 23, 24 and 25 respectively, the said dials being enameled on or secured to one face of transparent plate 10, the said dials being preferably provided with centrally opaque portions and surrounding portions divided into radial sections in each of which may be printed names, symbols or numbers. Each of the dials 22, 23, 24 and 25 has associated therewith an indicator 26, the said indicator 26 being mounted on a shaft 27 projecting from a pin or rivet 28 mounted on plate 10. Miniature windmills 29 are adapted to cause the rotation of the indicators and are each preferably mounted on shaft 27 in frictional engagement with the hubs of the indicators 26. Each windmill 29 is adapted to receive an initial impulse or blast of air from one of the orifices, thereby causing the associated indicator 26 to freely rotate until exhausted. Such rotation is made possible by virtue of the fact that the orifices 12, 13, 14 and 15 each lie in a plane perpendicular to and intersecting the body of each windmill 29. The rotation of the windmills 29 causes the rotation of the indicators 26 by reason of the fact that their respective hubs are in frictional engagement on common shaft 27. It is, of course, feasible to connect or mount the windmills 29 in any other way whereby the indicators are induced to rotation.

The opaque portions of the dials 22, 23, 24 and 25 preferably have diameters equal to the diameters of the windmills 29, so that only the ends of the indicators 26 beyond the limits of the said opaque portions together with the radial sections bearing names, symbols or numbers thereon are projected on the screen.

It is understood, of course, that the number of dials, the number of indicators and associated windmills therewith may be varied to suit any particular modification of competitive games.

In operation, the stereopticon slide hereinabove described is placed into the ordinary projection machine so that the image projected on the screen shows the indicators extending beyond the opaque central portions of the dials. While the image is thus projected on the screen, a source of air is released such as by the squeezing of bulb 17, thereby giving an impulse to the windmills 29, which latter in turn cause the indicators 26 to freely rotate about spindles 27. When the indicators come to a stop after exhaustion, they point to letters, numbers or symbols on the radial groups associated with each dial. The person or persons holding a card containing a combination of letters, numbers or symbols corresponding to the letters, numbers or symbols to which each indicator points after stoppage, wins the race.

The stereopticon slide, above described, may have its radial groups modified to contain pictures, names or other information to adapt the slide to changes in the game itself.

I claim:

A stereopticon slide comprising a grooved rectangular frame member, a single transparent plate mounted in said frame member with the edges of said plate arranged in the grooves of the frame member, said frame member being substantially thicker on one side of said plate than on the other, a transverse orifice passing through said thicker side, means for forcing a blast of air through said orifice, a shaft passing through said transparent plate, an indicator rotatably mounted on said shaft, a rotatable windmill in frictional engagement with said indicator and lying in a plane substantially parallel to the plane of said transparent plate and in the path of the blast of air forced through said orifice, whereby impingement of said blast of air on said windmill causes rotation thereof and said indicator.

SOL DASHKIN.